US012586579B2

(12) United States Patent　　　　　(10) Patent No.:　US 12,586,579 B2

Huang et al.　　　　　　　　　　　　　(45) Date of Patent:　　Mar. 24, 2026

(54) END-TO-END SEGMENTATION IN A TWO-PASS CASCADED ENCODER AUTOMATIC SPEECH RECOGNITION MODEL

(71) Applicant: Google LLC, Mountain View, CA (US)

(72) Inventors: Wenqian Ronny Huang, Mountain View, CA (US); Shuo-yiin Chang, Sunnyvale, CA (US); Tara N. Sainath, Jersey City, NJ (US); Yanzhang He, Mountain View, CA (US)

(73) Assignee: Google LLC, Mountain View, CA (US)

( * ) Notice: Subject to any disclaimer, the term of this patent is extended or adjusted under 35 U.S.C. 154(b) by 195 days.

(21) Appl. No.: 18/512,110

(22) Filed: Nov. 17, 2023

(65) Prior Publication Data

US 2024/0169981 A1　　May 23, 2024

Related U.S. Application Data

(60) Provisional application No. 63/384,217, filed on Nov. 17, 2022.

(51) Int. Cl.
G10L 15/197　　　(2013.01)
G10L 15/02　　　(2006.01)
(Continued)

(52) U.S. Cl.
CPC ............ G10L 15/197 (2013.01); G10L 15/02 (2013.01); G10L 15/05 (2013.01); G10L 15/063 (2013.01);
(Continued)

(58) Field of Classification Search
CPC ....... G10L 15/063; G10L 15/16; G10L 15/22; G10L 15/05; G10L 15/02; G10L 15/32;
(Continued)

(56) References Cited

U.S. PATENT DOCUMENTS

| | | | |
|---|---|---|---|
| 12,374,323 B2 * | 7/2025 | Ding ....................... | G10L 15/16 |
| 2022/0238101 A1 * | 7/2022 | Sainath .................. | G06N 3/045 |

(Continued)

FOREIGN PATENT DOCUMENTS

| | | | | |
|---|---|---|---|---|
| CN | 116229946 A | * | 3/2021 | .......... G10L 15/183 |
| CN | 112767926 B | | 6/2021 | |

(Continued)

OTHER PUBLICATIONS

International Search Report and Written Opinion issued in related PCT Application No. PCT/US2023/080188, dated Feb. 21, 2024.

*Primary Examiner* — Vijay B Chawan

(74) *Attorney, Agent, or Firm* — Honigman LLP; Brett A. Krueger; Grant Griffith

(57) ABSTRACT

A unified end-to-end segmenter and two-pass automatic speech recognition (ASR) model includes a first encoder, a first decoder, a second encoder, and a second decoder. The first encoder is configured to receive a sequence of acoustic frames and generate a first higher order feature representation. The first decoder is configured to receive the first higher order feature representation and generate, at each of a plurality of output steps, a first probability distribution and an indication of whether the output step corresponds to an end of speech segment, and emit an end of speech timestamp. The second encoder is configured to receive the first higher order feature representation and the end of speech timestamp, and generate a second higher order feature representation. The second decoder is configured to receive the second higher order feature representation and generate a second probability distribution.

37 Claims, 9 Drawing Sheets

(51) Int. Cl.
| | |
|---|---|
| *G10L 15/05* | (2013.01) |
| *G10L 15/06* | (2013.01) |
| *G10L 15/16* | (2006.01) |
| *G10L 15/22* | (2006.01) |

(52) U.S. Cl.
CPC ........ *G10L 15/16* (2013.01); *G10L 2015/025* (2013.01); *G10L 15/22* (2013.01)

(58) Field of Classification Search
CPC .......... G10L 2015/0631; G10L 15/197; G10L 2015/025; G10L 15/28; G10L 15/30; G10L 15/19; G10L 15/167; G10L 15/183; G10L 15/26; G06N 20/00; G06N 5/00
USPC .......................................................... 704/232
See application file for complete search history.

(56) References Cited

U.S. PATENT DOCUMENTS

| | | | | |
|---|---|---|---|---|
| 2022/0270597 A1 * | 8/2022 | Qiu | ........................ | G10L 15/22 |
| 2022/0310072 A1 * | 9/2022 | Sainath | .................... | G06N 3/08 |
| 2023/0298569 A1 * | 9/2023 | Ding | ....................... | G06N 3/045 |
| | | | | 704/243 |
| 2024/0169981 A1 * | 5/2024 | Huang | .................... | G10L 15/16 |

FOREIGN PATENT DOCUMENTS

| | | | | | |
|---|---|---|---|---|---|
| CN | 114495901 | A | | 5/2022 | |
| CN | 112509563 | A | * | 6/2023 | ............. G10L 15/16 |
| CN | 112435654 | B | * | 5/2024 | ........... G10L 15/063 |
| WO | 2022086252 | A1 | | 4/2022 | |

* cited by examiner $$P(\hat{y}_i \mid x_0, \dots, x_{t_i}, y_0, \dots, y_{u_{i-1}})$$

END-TO-END SEGMENTATION IN A TWO-PASS CASCADED ENCODER AUTOMATIC SPEECH RECOGNITION MODEL

CROSS REFERENCE TO RELATED APPLICATIONS

This U.S. patent application claims priority under 35 U.S.C. § 119(e) to U.S. Provisional Application 63/384,217, filed on Nov. 17, 2023. The disclosure of this prior application is considered part of the disclosure of this application and is hereby incorporated by reference in its entirety.

TECHNICAL FIELD

This disclosure relates to end-to-end (E2E) segmentation in a two-pass cascaded encoder automatic speech recognition (ASR) model.

BACKGROUND

Automatic speech recognition (ASR), the process of taking an audio input and transcribing it into text, is an important technology that is widely used in mobile devices and other devices. In general, automatic speech recognition attempts to provide accurate transcriptions of what a person has said by taking an audio input (e.g., speech utterance) and transcribing the audio input into text. Modern ASR models continue to improve in both accuracy (e.g., a low word error rate (WER)) and latency (e.g., delay between the client speaking and the transcription) based on the ongoing development of deep neural networks. When decoding long-form utterances, some ASR models perform speech segmentation to segment the utterance into shorter lengths, and deliver the final results for each segment. However, integrating segmentation with cascaded encoding may introduce user-perceived latency or deletion errors in transcribing speech into text.

SUMMARY

One aspect of the disclosure provides a unified end-to-end segmenter and two-pass automatic speech recognition (ASR) model that includes a first encoder, a first decoder, a second encoder, and a second decoder. The first encoder receives as input, a sequence of acoustic frames, the sequence of acoustic frames characterizing an utterance, and generates, at each of a plurality of output steps, a first higher order feature representation for a corresponding acoustic frame in the sequence of acoustic frames. The first decoder receives as input, the first higher order feature representation generated by the first encoder at each of the plurality of output steps, at generates, at each of the plurality of output steps, a first probability distribution over possible speech recognition hypotheses and an indication of whether the corresponding output step corresponds to an end of speech segment, and at a corresponding output step among the plurality of output steps that corresponds to the end of speech segment, emits an end of speech timestamp. The second encoder receives, as input, the first higher order feature representation generated by the first encoder at each of the plurality of output steps and the end of speech timestamp emitted by the first decoder, and generates, at each of the plurality of output steps, a second higher order feature representation for a corresponding first higher order feature representation. The second decoder receives, as input, the second higher order feature representation generated by the second encoder at each of the plurality of output steps, and generates, at each of the plurality of output steps, a second probability distribution over possible speech recognition hypotheses Implementations of the disclosure may include one or more of the following optional features. In some implementations, when the end of speech timestamp is emitted by the first decoder, the corresponding output step at which the second probability distribution over possible speech recognition results is generated by the second decoder is delayed a predefined number of output steps from the corresponding output step at which the first probability distribution over possible speech recognition results is generated. Here, when the end of speech timestamp is emitted by the first decoder, the second decoder may be configured to generate the second probability distribution over possible speech recognition results for each of the next predefined number of output steps before finalizing a transcription of the utterance. Additionally or alternatively, when the end of speech timestamp is emitted by the first decoder, the second encoder receives, at the corresponding output step among the plurality of output steps that corresponds to the end of speech segment, an injected number of dummy right-context frames simultaneously and processes the injected number of dummy right-context frames in parallel, and second decoder finalizes a transcription of the utterance based on the second probability distributions over possible speech recognition results generated up until the output step when the injected number of dummy right-context frames are processed in parallel by the second encoder without waiting a duration equal to the predefined number of output steps before finalizing the transcription of the utterance. All of the dummy right-context frames may be represented by an identical vector. Here, the identical vector representing all of the dummy right-context frames may include a zero vector. Optionally, all of the dummy right-context frames are identical to the first higher order feature representation generated by the first encoder at the corresponding output step among the plurality of output steps that corresponds to the end of speech segment.

In some examples, the first decoder generates partial speech recognition results based on the first probability distribution over possible speech recognition hypotheses. The first encoder may include a causal encoder including one of a plurality of unidirectional long short-term memory (LSTM) layers, a plurality of conformer layers, a plurality of transformer layers, or a plurality of multi-head attention layers other than conformer or transformer layers. The second encoder may include a non-causal encoder including one of a plurality of unidirectional long short-term memory (LSTM) layers, a plurality of conformer layers, a plurality of transformer layers, or a plurality of multi-head attention layers other than conformer or transformer layers.

In some implementations, the first decoder includes a prediction network, a first joint network, and a second joint network. The prediction network receives, as input, a sequence of non-blank symbols output by a final softmax layer, and generates, at each of the plurality of output steps, a dense representation. The first joint network receives, as input, the dense representation generated by the prediction network at each of the plurality of output steps and the first higher order feature representation generated by the first encoder at each of the plurality of output steps, and generates, at each of the plurality of output steps, the first probability distribution over possible speech recognition hypotheses. The second joint network receives, as input, the dense representation generated by the prediction network at each of the plurality of output steps and the higher order feature representation generated by the encoder at each of the plurality of output steps, and generates, at each of the plurality of output steps, the indication of whether the corresponding time step corresponds to the end of speech segment. In these implementations, at each of the plurality of output steps, the sequence of previous non-blank symbols received as input at the prediction network may include a sequence of N previous non-blank symbols output by the final softmax layer, and the prediction network generates the dense representation by, for each non-blank symbol of the sequence of N previous non-blank symbols, generating a respective embedding, and generating an average embedding by averaging the respective embeddings, the average embedding including the dense representation. The prediction network may include a long short-term memory (LSTM)-based prediction network, or a V2 embedding look-up table.

In some examples, the second decoder includes a prediction network and a joint network. The prediction network receives, as input, a sequence of non-blank symbols output by a final softmax layer, and generates, at each of the plurality of output steps, a dense representation. The joint network receives, as input, the dense representation generated by the prediction network at each of the plurality of output steps and the second higher order feature representation generated by the second encoder at each of the plurality of output steps, receives, as input, the end of speech timestamp emitted by the first decoder, and generates, at each of the plurality of output steps, the second probability distribution over possible speech recognition hypotheses. The prediction network may include a long short-term memory (LSTM)-based prediction network, or a V2 embedding look-up table. In some implementations, the first encoder includes a greater number of parameters than the second encoder.

In some examples, the unified end-to-end segmenter and two-pass ASR model is trained on a set of training samples. Here, each training sample in the set of training samples includes audio data characterizing a spoken utterance, and a corresponding transcription of the spoken utterance, the corresponding transcription having an end of speech ground truth label inserted into the corresponding transcription automatically based on a set of heuristic-based rules and exceptions applied to the training sample. In these examples, the training process may train the unified end-to-end segmenter and two-pass ASR model on the set of training samples by initially training a first joint network of the first decoder to learn how to predict the corresponding transcription of the spoken utterance characterized by the audio data of each training sample, and, after training the first joint network, initializing a second joint network of the first decoder with the same parameters as the trained first joint network and using the end of speech ground truth label inserted into the corresponding transcription of the spoken utterance characterized by the audio data of each training sample. The end of speech ground truth label may be inserted into the corresponding transcription automatically without any human annotation. The set of heuristic-based rules and exceptions applied to each training sample in the set of training samples may include inserting the end of speech ground truth label at the end of the corresponding transcription, and inserting the end of speech ground truth label into the corresponding transcription at a location aligned with a non-speech segment of the audio data having a duration that satisfies a threshold duration unless the non-speech segment of the audio data follows a word in the spoken utterance that is identified as a lengthened word or a filler word. Here, the word in the spoken utterance may be identified as the lengthened word when a phoneme duration of the word satisfies a standard deviation threshold. In these examples, after training the unified end-to-end segmenter and two-pass ASR model, the first decoder may emit the indication that the corresponding output step corresponds to the end of speech segment sooner than identifying a number of consecutive non-speech acoustic frames in the sequence of acoustic frames that satisfy the threshold duration. The unified end-to-end segmenter and two-pass ASR model may be trained to maximize a probability of emitting the end of speech ground truth label.

Another aspect of the disclosure provides a computer-implemented method that when executed on data processing hardware causes the data processing hardware to perform operations that include receiving a sequence of acoustic frames characterizing an utterance and, at each of a plurality of output steps, generating, by a first encoder of a unified end-to-end segmenter and two-pass ASR model, a first higher order feature representation for a corresponding acoustic frame in the sequence of acoustic frames, and generating, by a first decoder of the unified end-to-end segmenter and two-pass ASR model, based on the first higher order feature representation generated by the first encoder for the corresponding acoustic frame, a first probability distribution over possible speech recognition hypotheses, and an indication of whether the corresponding output step corresponds to an end of speech segment. At a corresponding output step among the plurality of output steps that corresponds to the end of speech segment, the operations also include emitting, by the first decoder, an end of speech timestamp. The operations also include, at each of the plurality of output steps, generating, by a second encoder of the unified end-to-end segmenter and two-pass ASR model, based on the first higher order feature representations generated by the first encoder, a second higher order feature representation, where, at the corresponding output step among the plurality of output steps that corresponds to the end of speech segment, the second higher order feature representation generated by the second encoder is further based on the end of speech time stamp emitted by the first decoder, and generating, by a second decoder of the unified end-to-end segmenter and two-pass ASR model, based on the second higher order feature representation generated by the second encoder at the corresponding output step, a second probability distribution over possible speech recognition hypotheses.

This aspect may include one or more of the following optional features. In some implementations, when the end of speech time stamp is emitted by the first decoder, the corresponding output step at which the second probability distribution over possible speech recognition results is generated by the second decoder is delayed a predefined number of output steps from the corresponding output step at which the first probability distribution over possible speech recognition results is generated. Here, when the end of speech timestamp is emitted by the first decoder, generating the second probability distribution over possible speech recognition results includes generating, by the second decoder, the second probability distribution over possible speech recognition results for each of the next predefined number of output steps before finalizing a transcription of the utterance. Additionally or alternatively, the operations further include, when the end of speech timestamp is emitted by the first decoder, injecting a number of dummy right-context frames simultaneously into the second encoder at the corresponding output step among the plurality of output steps that corresponds to the end of speech segment, processing, by the second encoder, the injected number of dummy right-context frames in parallel, and finalizing, by the second decoder, a transcription of the utterance based on the second probability distributions over possible speech recognition results generated up until the output step when the injected number of dummy right-context frames are processed in parallel by the second encoder without waiting a duration equal to the predefined number of output steps before finalizing the transcription of the utterance. All of the dummy right-context frames may be represented by an identical vector. Here, the identical vector representing all of the dummy right-context frames may include a zero vector. Optionally, all of the dummy right-context frames are identical to the first higher order feature representation generated by the first encoder at the corresponding output step among the plurality of output steps that corresponds to the end of speech segment.

In some examples, the unified end-to-end segmenter and two-pass ASR model is trained on a set of training samples. Here, each training sample in the set of training samples includes audio data characterizing a spoken utterance, and a corresponding transcription of the spoken utterance, the corresponding transcription having an end of speech ground truth label inserted into the corresponding transcription automatically based on a set of heuristic-based rules and exceptions applied to the training sample. In these examples, the training process may train the unified end-to-end segmenter and two-pass ASR model on the set of training samples by initially training a first joint network of the first decoder to learn how to predict the corresponding transcription of the spoken utterance characterized by the audio data of each training sample, and, after training the first joint network, initializing a second joint network of the first decoder with the same parameters as the trained first joint network and using the end of speech ground truth label inserted into the corresponding transcription of the spoken utterance characterized by the audio data of each training sample. The end of speech ground truth label may be inserted into the corresponding transcription automatically without any human annotation. The set of heuristic-based rules and exceptions applied to each training sample in the set of training samples may include inserting the end of speech ground truth label at the end of the corresponding transcription, and inserting the end of speech ground truth label into the corresponding transcription at a location aligned with a non-speech segment of the audio data having a duration that satisfies a threshold duration unless the non-speech segment of the audio data follows a word in the spoken utterance that is identified as a lengthened word or a filler word. Here, the word in the spoken utterance may be identified as the lengthened word when a phoneme duration of the word satisfies a standard deviation threshold. In these examples, after training the unified end-to-end segmenter and two-pass ASR model, the first decoder may emit the indication that the corresponding output step corresponds to the end of speech segment sooner than identifying a number of consecutive non-speech acoustic frames in the sequence of acoustic frames that satisfy the threshold duration. The unified end-to-end segmenter and two-pass ASR model may be trained to maximize a probability of emitting the end of speech ground truth label.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
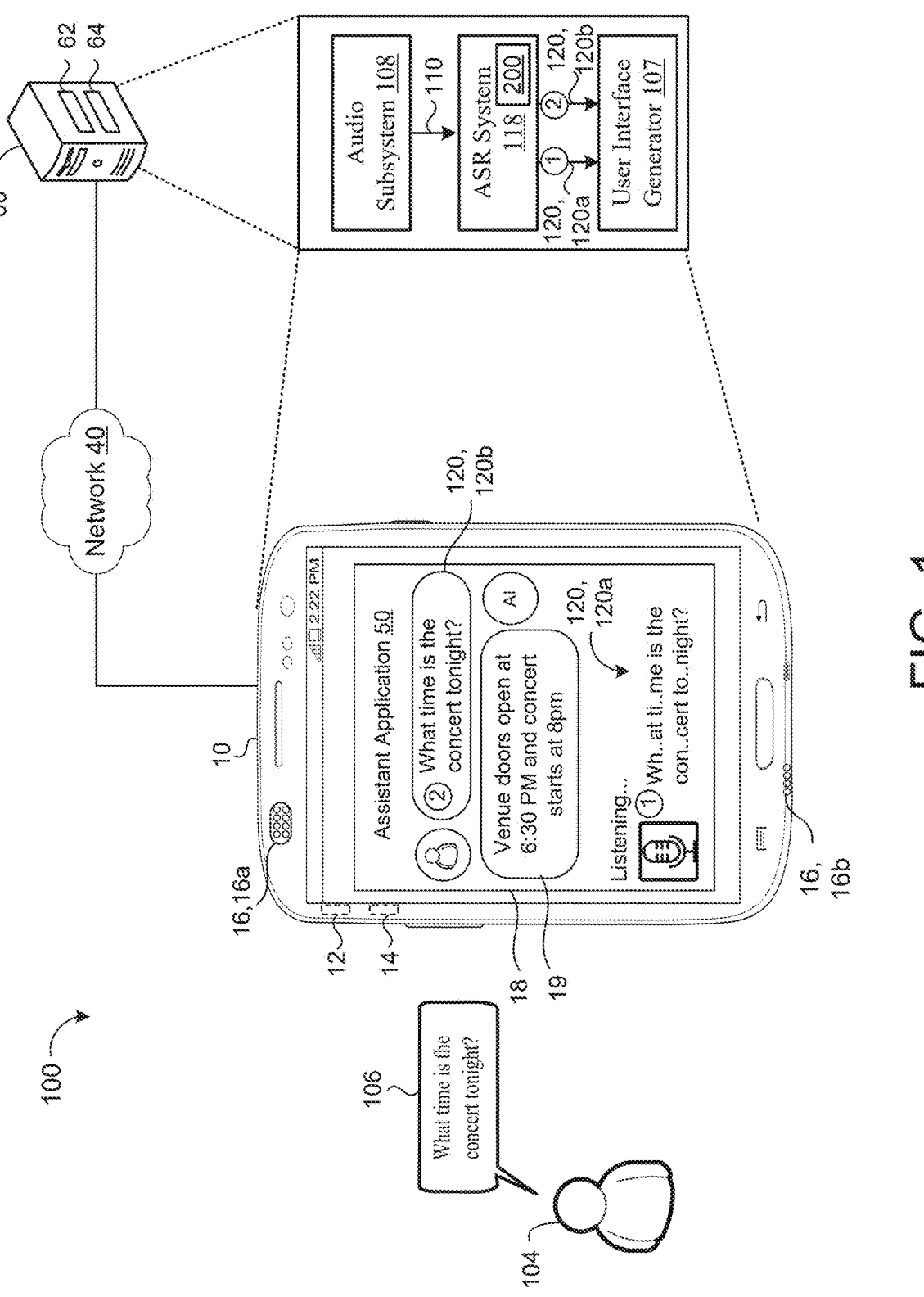
FIG. 1 is a schematic view of system that includes an automated speech recognition (ASR) system implementing a unified end-to-end (E2E) segmenter and two-pass cascaded encoder ASR model.

Training end-to-end (E2E) automatic speech recognition (ASR) models aims to jointly optimize different components of the ASR model using a single neural network. Typically, the single neural network of the ASR model combines acoustic, pronunciation, and language models such that the single neural network performs an ASR task of transcribing text from input audio data. Recently, some E2E ASR models have integrated other auxiliary tasks in addition to the ASR task. For example, when decoding long-form utterances, ASR models may include a segmenter to segment the utterance into shorter lengths (e.g., when a speaker pauses or has finished speaking) to generate partial recognition results.

In some approaches, segmentation requires the ASR model include a classifier (e.g., a voice activity detector) that predicts whether each frame in an utterance is speech or silence. When the classifier predicts a threshold number of consecutive frames (e.g., 200 milliseconds (ms)) as silent, it emits an end-of-segment (EOS) token that finalizes the top hypothesis. As such, a poorly placed EOS token can lead to a wrong hypothesis being finalized. Moreover, there are multiple disadvantages to this approach. In particular, the classifier requires a state machine with hand-crafted hyperparameters which adds complexity to the ASR model, and the classifier is only conditioned on acoustic features (i.e., speech or silence).

To address these issues, a segmenter may be integrated into the E2E ASR model. There are numerous benefits of integrating segmentation into the E2E ASR model including the segmenter having access to both acoustic and language model features of the ASR model and introducing only a relatively small amount of additional parameters to the ASR model since the segmenter shares most parameters with the ASR task. Performing E2E segmentation requires the ASR model to predict EOS tokens in addition to predicting wordpiece tokens used for the ASR task. However, in a two-pass cascaded encoder ASR model, a key challenge is allowing the segmenter to finalize the non-causal second pass without introducing user-perceived latency or deletion errors during inference. In particular, in applications where utterances are long but require quick second-pass finalization, such as live captioning, dictation, or conversation agents.

Accordingly, implementations herein are directed towards methods and systems of E2E segmentation in a two-pass cascaded encoder ASR model. In this approach, an additional Recurrent Neural Network-Transducer (RNN-T) joint layer is added to the ASR model and trained to predict the EOS token by leveraging both acoustic and linguistic context available to the ASR model. In a traditional E2E segmenter, the EOS token is predicted by the decoder. However, in a two-pass cascaded encoder ASR model, the second pass is decoded in parallel with the first pass, but in a time-staggered fashion (e.g., 900 ms) so that the second pass decoder can access right-context audio frames. Here, if the EOS token is determined by the second pass decoder, the EOS token timestamp will always be at least 900 ms behind real-time, which is a prohibitive amount of latency. Rather than wait for the second pass of the cascaded encoder to finalize and predict an EOS token, implementations herein are directed to predicting the EOS token in real-time during the first pass of the cascaded encoder. The EOS token is then used to finalize the second pass to provide high quality results with a low finalization latency.

FIG. 1 is an example system 100 that includes one or more users 104 interacting with a user device 10 through voice input. The user device 10 (also referred to generally as a device 10) is configured to capture sounds (e.g., streaming audio data) from the one or more users 104 within the system 100. Here, the streaming audio data may refer to an utterance 106 spoken by the user 104 that functions as an audible query, a command for the user device 10, or an audible communication captured by the device 10. Speech-enabled systems of the user device 10 may field the query or the command by answering the query and/or causing the command to be performed/fulfilled by one or more downstream applications.

The user device 10 may correspond to any computing device associated with the user 104 and capable of receiving audio data. Some examples of user devices 10 include, but are not limited to, mobile devices (e.g., smart watches), smart appliances, internet of things (IOT) devices, vehicle infotainment systems, smart displays, smart speakers, etc. The user device 10 includes data processing hardware 12 and memory hardware 14 in communication with the data processing hardware 12 and stores instructions that, when executed by the data processing hardware 12, cause the data processing hardware 12 to perform one or more operations. The user device 10 further includes an audio system 16 with an audio capture device (e.g., microphone) 16, 16a for capturing and converting the utterances 106 into electrical signals and a speech output device (e.g., a speaker) 16, 16b for communicating with an audible audio signal (e.g., as output data from the user device 10). The user device 10 may implement an array of audio capture devices 16a without departing from the scope of the present disclosure, whereby one or more capture devices 16a in the array may not physically reside on the user device 10, but be in communication with the audio system 16.

The system 100 includes an automated speech recognition (ASR) system 118 that implements a unified end-to-end (E2E) segmenter and two-pass cascaded encoder ASR model 200, 400 (also referred to generally as the ASR model 200, 400) and resides on the user device 10 of the user 104 and/or on a remote computing device 60 (e.g., one or more remote servers of a distributed system executing in a cloud-computing environment) in communication with the user device 10 via a network 40. The remote computing device 60 also includes data processing hardware 62 and memory hardware 64 storing instructions that when executed on the data processing hardware 62 cause the data processing hardware 62 to perform operations. In some examples, the ASR model 200 may be a Recurrent Neural Network-Transducer (RNN-T) model. The user device 10 and/or the remote computing device 60 also includes an audio subsystem 108 configured to receive the utterance 106 spoken by the user 104 and captured by the audio capture device 16a, and convert the utterance 106 into a corresponding digital format associated with input acoustic frames 110 capable of being processed by the ASR system 118. In the example shown, the user speaks a respective utterance 106 and the audio subsystem 108 converts the utterance 106 into corresponding audio data (e.g., a sequence of acoustic frames) 110 for input to the ASR system 118. Thereafter, the ASR model 200 receives, as input, the sequence of acoustic frames 110 corresponding to the utterance 106, and generates/predicts, at each output step, a corresponding transcription 120 (e.g., speech recognition result/hypothesis) of the utterance 106 as the ASR model receives (e.g., processes) each acoustic frame 110 in the sequence of acoustic frames 110.

In the example shown, the ASR model 200 may perform streaming speech recognition to produce an initial speech recognition result 120, 120a and, after detecting that a particular acoustic frame 110 corresponds to an end-of-speech (EOS) segment 110E, emit an EOS timestamp 412 and generate a final speech recognition result 120, 120b by improving the initial speech recognition result 120a. The speech recognition results 120 may either correspond to a partial speech recognition result or an entire speech recognition result. Stated differently, the speech recognition result 120 may either correspond to a portion of an utterance 106 or an entire utterance 106. For example, the partial speech recognition result may correspond to a portion of a spoken utterance or even a portion of a spoken term. However, as will become apparent, the ASR model 200 performs additional processing on the final speech recognition result 120b whereby the final speech recognition result 120b may be delayed from the initial speech recognition result 120a.

The user device 10 and/or the remote computing device 60 also executes a user interface generator 107 configured to present a representation of the transcription 120 of the utterance 106 to the user 104 of the user device 10. As described in greater detail below, the user interface generator 107 may display the initial speech recognition results 120a in a streaming fashion during time 1 and subsequently display the final speech recognition results 120b in a streaming fashion during time 2. In some configurations, the transcription 120 output from the ASR system 118 is processed, e.g., by a natural language understanding (NLU) module executing on the user device 10 or the remote computing device 60, to execute a user command/query specified by the utterance 106. Additionally or alternatively, a text-to-speech system (not shown) (e.g., executing on any combination of the user device 10 or the remote computing device 60) may convert the transcription 120 into synthesized speech for audible output by the user device 10 and/or another device.

In the example shown, the user 104 interacts with a program or application 50 (e.g., a digital assistant application 50) of the user device 10 that uses the ASR system 118. For instance, FIG. 1 depicts the user 104 communicating with the digital assistant application 50 and the digital assistant application 50 displaying a digital assistant interface 18 on a screen of the user device 10 to depict a conversation between the user 104 and the digital assistant application 50. In this example, the user 104 asks the digital assistant application 50, "What time is the concert tonight?" This question from the user 104 is a spoken utterance 106 captured by the audio capture device 16*a* and processed by audio systems 16 of the user device 10. In this example, the audio system 16 receives the spoken utterance 106 and converts it into a sequence of acoustic frames 110 for input to the ASR system 118.

Continuing with the example, the ASR model 200, while receiving the sequence of acoustic frames 110 corresponding to the utterance 106 as the user 104 speaks, encodes the sequence of acoustic frames 110 and then decodes the encoded sequence of acoustic frames 110 into the initial speech recognition results 120*a*. During time 1, the user interface generator 107 presents, via the digital assistant interface 18, a representation of the initial speech recognition results 120*a* of the utterance 106 to the user 104 of the user device 10 in a streaming fashion such that words, word pieces, and/or individual characters appear on the screen as soon as they are spoken. In some examples, the first look ahead audio context is equal to zero.

During time 2, the user interface generator 107 presents, via the digital assistant interface 18, a representation of the final speech recognition results 120*b* of the utterance 106 to the user 104 of the user device 10 in a streaming fashion such that words, word pieces, and/or individual characters appear on the screen as soon as they are generated by the ASR model 200. In some implementations, the user interface generator 107 replaces the representation of the initial speech recognition results 120*a* presented at time 1 with the representation of the final speech recognition results 120*b* presented at time 2. Here, time 1 and time 2 may include timestamps corresponding to when the user interface generator 107 presents the respective speech recognition result 120. In this example, the timestamp of time 1 indicates that the user interface generator 107 presents the initial speech recognition results 120*a* at an earlier time than the final speech recognition results 120*b*. For instance, as the final speech recognition result 120*b* is presumed to be more accurate than the initial speech recognition result 120*a*, the final speech recognition result 120*b* ultimately displayed as the transcription 120 may fix any terms that may have been misrecognized in the initial speech recognition results 120*a*. In this example, the streaming initial speech recognition results 120*a* output by the ASR model 200 are displayed on the screen of the user device 10 at time 1 are associated with low latency and provide responsiveness to the user 104 that his/her query is being processed, while the final speech recognition result 120*b* output by the ASR model 200 and displayed on the screen at time 2 leverages an additional speech recognition model and/or a language model to improve the speech recognition quality in terms of accuracy, but at increased latency. However, since the initial speech recognition results 120*a* are displayed as the user speaks the utterance 106, the higher latency associated with producing, and ultimately displaying the final speech recognition results 120*b* is not noticeable to the user 104.

In the example shown in FIG. 1, the digital assistant application 50 may respond to the question posed by the user 104 using natural language processing. Natural language processing generally refers to a process of interpreting written language (e.g., the initial speech recognition result 120*a* and/or the final speech recognition result 120*b*) and determining whether the written language prompts any action. In this example, the digital assistant application 50 uses natural language processing to recognize that the question from the user 104 regards the user's schedule and more particularly a concert on the user's schedule. By recognizing these details with natural language processing, the automated assistant returns a response 19 to the user's query where the response 19 states, "Venue doors open at 6:30 PM and concert starts at 8 pm." In some configurations, natural language processing occurs on the remote computing device 60 in communication with the data processing hardware 12 of the user device 10.

Figure 2:
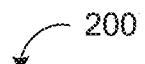
FIG. 2 is a schematic view of the unified E2E segmenter and two-pass cascaded encoder ASR model of FIG. 1.
Figure 2:
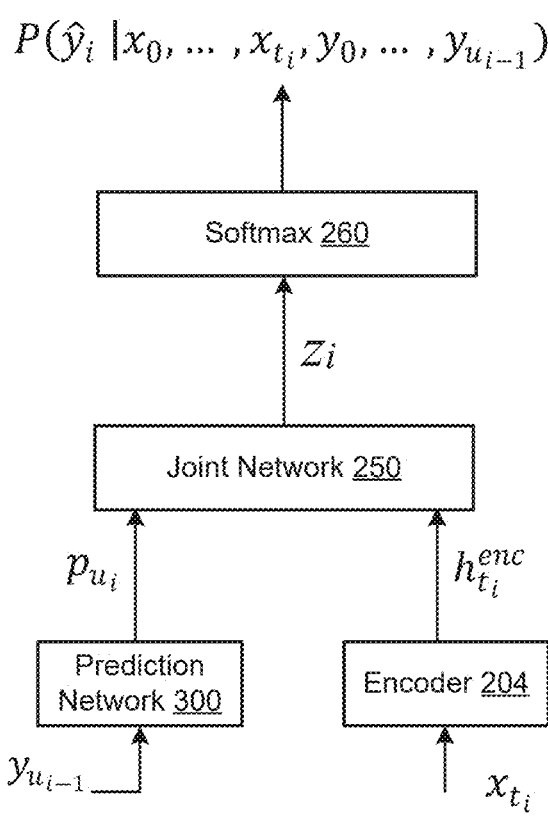

Referring to FIG. 2, an example ASR model 200 may include the RNN-T model architecture which adheres to latency constraints associated with interactive applications. The use of the RNN-T model architecture is exemplary only, and the ASR model 200 may include other architectures such as transformer-transducer and conformer-transducer model architectures among others. The RNN-T model architecture provides a small computational footprint and utilizes less memory requirements than conventional ASR architectures, making the RNN-T model architecture suitable for performing speech recognition entirely on the user device 102 (e.g., no communication with a remote server is required). The RNN-T model architecture of the ASR model 200 includes an encoder network 204, a prediction network 300, and a joint network 250. The encoder network 204, which is roughly analogous to an acoustic model (AM) in a traditional ASR system, includes a recurrent network of stacked Long Short-Term Memory (LSTM) layers. For instance, the encoder network (e.g., encoder) 204 reads a sequence of d-dimensional feature vectors (e.g., sequence of acoustic frames 110 (FIG. 1)) $x=(x_1, x_2, \ldots, x_T)$, where $x_i \in \mathbb{R}^d$, and produces, at each of a plurality of output steps, a higher-order feature representation. This higher-order feature representation may also be denoted as $h_1^{enc}, \ldots, h_T^{enc}$.

Similarly, the prediction network 300 is also an LSTM network, which, like a language model (LM), processes the sequence of non-blank symbols output by a final Softmax layer 260 so far, $y_0, \ldots, y_{ui-1}$, into a dense representation $p_{u_i}$. Finally, with the RNN-T model architecture, the representations produced by the encoder and prediction/decoder networks 204, 300 are combined by the joint network 250. The prediction network 300 may be replaced by an embedding look-up table (e.g., a V2 embedding lookup table) to improve latency by outputting looked-up sparse embeddings in lieu of processing dense representations. The joint network 250 then predicts $P(y_i|x_{t_i}, y_0, \ldots, y_{u_{i-1}})$, which is a distribution over the next output symbol. Stated differently, the joint network 250 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 250 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 250 can include a posterior probability value for each of the different output labels. Thus, if there are 100 different output labels representing different graphemes or other symbols, the output $y_i$ of the joint network 250 can include 100 different probability values, one for each output label. The probability distribution can then be used to select and assign scores to candidate orthographic elements (e.g., graphemes, wordpieces, and/or words) in a beam search process (e.g., by the Softmax layer 260) for determining the transcription 120.

The Softmax layer 260 may employ any technique to select the output label/symbol with the highest probability in the distribution as the next output symbol predicted by the ASR model 200 at the corresponding output step. In this manner, the RNN-T model architecture of the ASR model 200 does not make any conditional independent assumptions, rather the prediction of each symbol is conditioned not only on the acoustic frames 110 but also on the sequence of labels output so far. As such, the Softmax layer 260 may select the speech recognition hypothesis having a highest corresponding probability from the probability distribution as the transcription 120. The ASR model 200 does assume an output symbol is independent of future acoustic frames 110, which allows the ASR model 200 to be employed in a streaming fashion.

In some examples, the encoder 204 of the ASR model 200 includes a plurality of multi-head (e.g., 8 heads) self-attention layers. For example, the plurality of multi-head self-attention layers may include Conformer layers (e.g., Conformer-encoder), transformer layers, performer layers, convolution layers (including lightweight convolution layers), or any other type of multi-head self-attention layers. The plurality of multi-head self-attention layers may include any number of layers, for instance 16 layers. Moreover, the encoder 204 may operate in a streaming fashion (e.g., the encoder 204 outputs the higher-order feature representations as soon as they are generated) or in a non-streaming fashion whereby the encoder 204 processes additional right-context to improve upon the speech recognition results.

Figure 3:
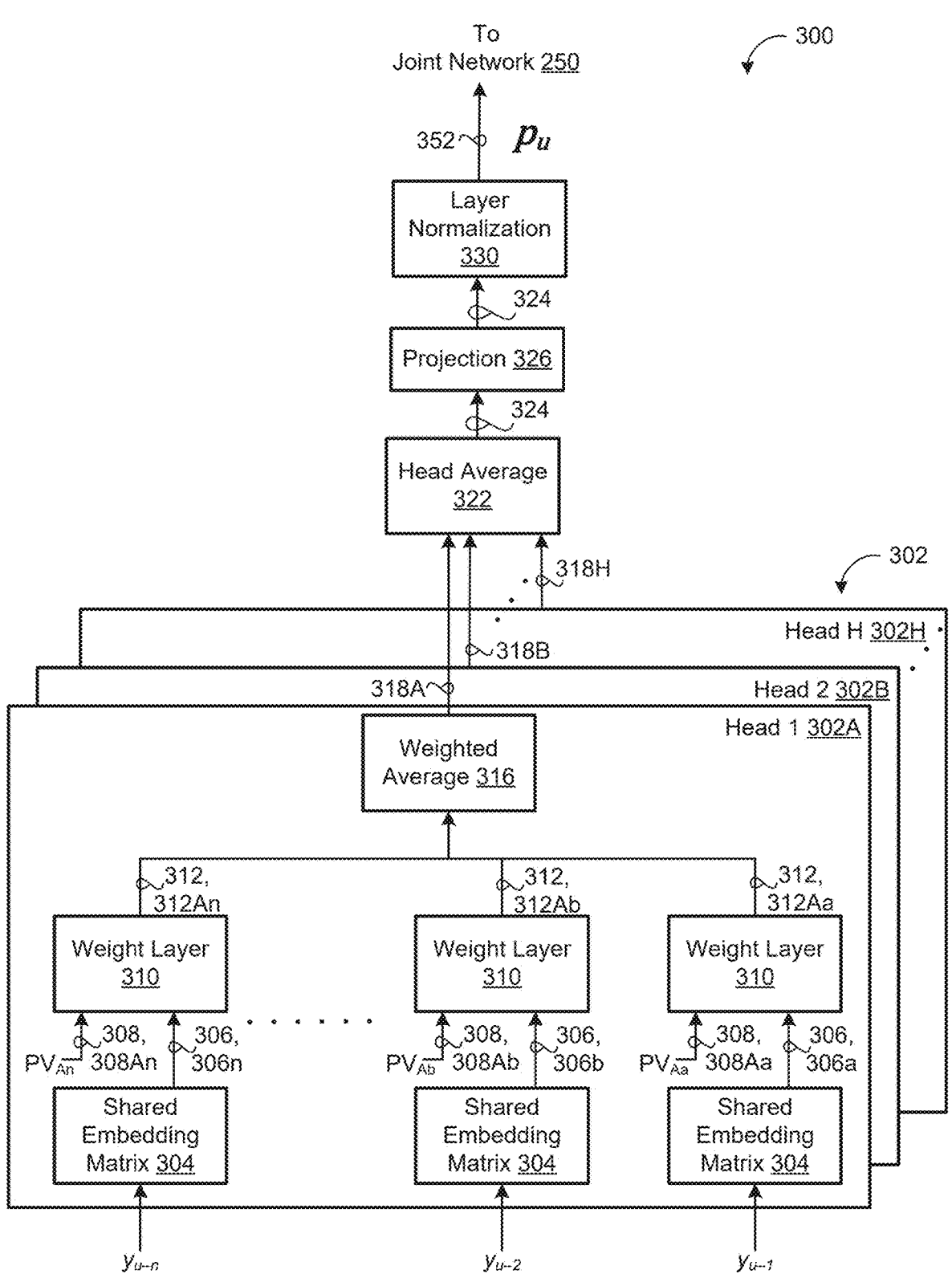
FIG. 3 is a schematic view of a prediction network implemented by the unified E2E segmenter and two-pass cascaded encoder ASR model of FIG. 1.

FIG. 3 shows the prediction network 300 for the RNN-T model 200 that receives, as input, a sequence of non-blank symbols $y_{u-n}, \ldots, y_{u-1}$ that is limited to the N previous non-blank symbols output by the final softmax layer 260. In some examples, N is equal to two. In other examples, N is equal to five, however, the disclosure is non-limiting and N may equal any integer. The sequence of non-blank symbols may indicate a partial speech recognition result 120a, 120b (FIG. 1). In some implementations, the prediction network 300 includes a multi-headed attention mechanism 302 that shares a shared embedding matrix 304 across each head 302A-302H of the multi-headed attention mechanism. In one example, the multi-headed attention mechanism 302 includes four heads. However, any number of heads may be employed by the multi-headed attention mechanism 302. Notably, the multi-headed attention mechanism 302 improves performance significantly with minimal increase to model size. As described in greater detail below, each head 302A-H includes its own row of position vectors 308, and rather than incurring an increase in model size by concatenating outputs 318A-H from all the heads, the outputs 318A-H are instead averaged by a head average module 322.

Referring to the first head 302A of the multi-headed attention mechanism 302, the head 302A generates, using the shared embedding matrix 304, a corresponding embedding 306, 306a-n (e.g., $X \in \mathbb{R}^{N \times d_e}$) for each non-blank symbol among the sequence of non-blank symbols $y_{ui-n}, \ldots, y_{un-1}$ received as input at the corresponding output step from the plurality of output steps. Notably, since the shared embedding matrix 304 is shared across all heads of the multi-headed attention mechanism 302, the other heads 302B-H all generate the same corresponding embeddings 306 for each non-blank symbol. The head 302A also assigns a respective position vector $PV_{Aa-An}$ 308, 308Aa-An (e.g., $P \in \mathbb{R}^{H \times N \times d_e}$) to each corresponding non-blank symbol in the sequence of non-blank symbols $y_{u-n}, \ldots, y_{u-1}$. The respective position vector PV 308 assigned to each non-blank symbol indicates a position in the history of the sequence of non-blank symbols (e.g., the N previous non-blank symbols output by the final softmax layer 240). For instance, the first position vector $PV_{Aa}$ is assigned to a most recent position in the history, while the last position vector $PV_{An}$ is assigned to a last position in the history of the N previous non-blank symbols output by the final softmax layer 240. Notably, each of the embeddings 306 may include a same dimensionality (i.e., dimension size) as each of the position vectors PV 308.

While the corresponding embedding generated by shared embedding matrix 304 for each for each non-blank symbol among the sequence of non-blank symbols, $y_{u-n}, \ldots, y_{u-1}$, is the same at all of the heads 302A-H of the multi-headed attention mechanism 302, each head 302A-H defines a different set/row of position vectors 308. For instance, the first head 302A defines the row of position vectors $PV_{Aa-An}$ 308Aa-An, the second head 302B defines a different row of position vectors $PV_{Ba-Bn}$ 308Ba-Bn, ..., and the $H^{th}$ head 302 H defines another different row of position vectors $PV_{Ha-Hn}$ 308Ha-Hn.

For each non-blank symbol in the sequence of non-blank symbols received, the first head 302A also weights, via a weight layer 310, the corresponding embedding 306 proportional to a similarity between the corresponding embedding and the respective position vector PV 308 assigned thereto. In some examples, the similarity may include a cosine similarity (e.g., cosine distance). In the example shown, the weight layer 310 outputs a sequence of weighted embeddings 312, 312Aa-An each associated the corresponding embedding 306 weighted proportional to the respective position vector PV 308 assigned thereto. Stated differently, the weighted embeddings 312 output by the weight layer 310 for each embedding 306 may correspond to a dot product between the embedding 306 and the respective position vector PV 308. The weighted embeddings 312 may be interpreted as attending over the embeddings in proportion to how similar they are to the positioned associated with their respective position vectors PV 308. To increase computational speed, the prediction network 300 includes non-recurrent layers, and therefore, the sequence of weighted embeddings 312Aa-An are not concatenated, but instead, averaged by a weighted average module 316 to generate, as output from the first head 302A, a weighted average 318A of the weighted embeddings 312Aa-An represented by:

$$\text{Prediction}(X, P) = \frac{1}{H * N} \sum_{h,n} X_n * \sum_{e} (X_{n,e} * P_{h,n,e}) \quad (1)$$

In Equation 1, h represents the index of the heads 302, n represents position in context, and e represents the embedding dimension. Additionally, in Equation (1), H, N, and $d_e$ include the sizes of the corresponding dimensions. The position vector PV 308 does not have to be trainable and may include random values. Notably, even though the weighted embeddings 312 are averaged, the position vectors PV 308 can potentially save position history information, alleviating the need to provide recurrent connections at each layer of the prediction network 300.

The operations described above with respect to the first head 302A, are similarly performed by each other head 302B-H of the multi-headed attention mechanism 302. Due to the different set of positioned vectors PV 308 defined by each head 302, the weight layer 310 outputs a sequence of weighted embeddings 312Ba-Bn, 312Ha-Hn at each other head 302B-H that is different than the sequence of weighted embeddings 312Aa-Aa at the first head 302A. Thereafter, the weighted average module 316 generates, as output from each other corresponding head 302B-H, a respective weighted average 318B-H of the corresponding weighted embeddings 312 of the sequence of non-blank symbols.

In the example shown, the prediction network 300 includes a head average module 322 that averages the weighted averages 318A-H output from the corresponding heads 302A-H. A projection layer 326 with SWISH may receive, as input, an output 324 from the head average module 322 that corresponds to the average of the weighted averages 318A-H, and generate, as output, a projected output 328. A final layer normalization 330 may normalize the projected output 328 to provide the single embedding vector $P_u$ 352 (i.e., hidden representation) at the corresponding output step from the plurality of output steps. The prediction network 300 generates only a single embedding vector $P_u$ 352 at each of the plurality of output steps subsequent to an initial output step.

In some configurations, the prediction network 300 does not implement the multi-headed attention mechanism 302 and only performs the operations described above with respect to the first head 302A. In these configurations, the weighted average 318A of the weighted embeddings 312Aa-An is simply passed through the projection layer 326 and layer normalization 330 to provide the single embedding vector $P_u$ 352.

Figure 4:
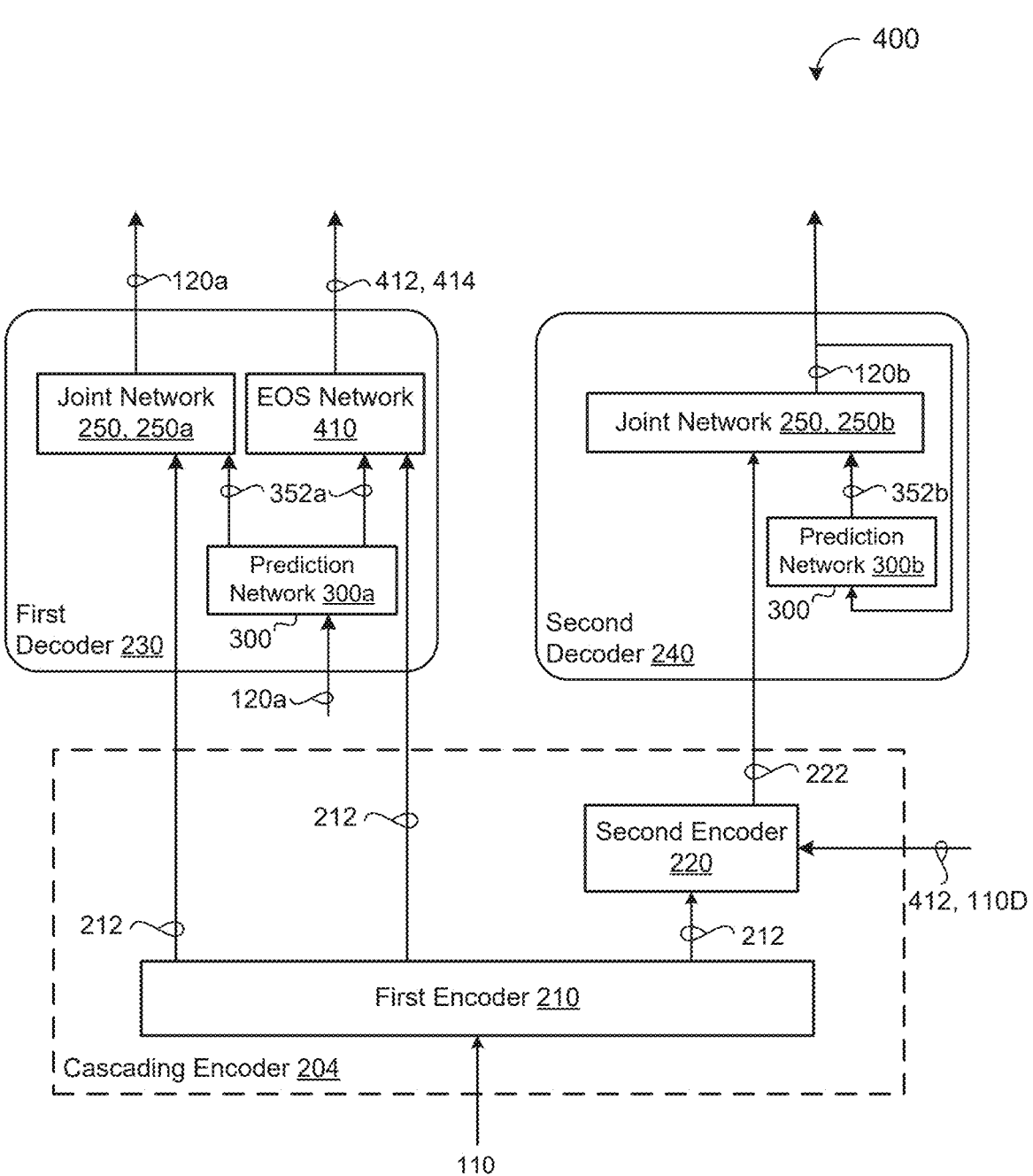
FIG. 4 is a schematic view of an example of the two-pass cascaded encoder ASR model of FIG. 1.

Referring to FIG. 4, in some implementations, the ASR model 400 includes a cascading encoder 204, a first decoder 230, and a second decoder 240. Here, the second decoder 240 is configured to improve upon initial speech recognition results 120a output by the first decoder 230. The first decoder 230 may operate in a streaming fashion such that the first decoder 230 is configured to generate partial speech recognition results corresponding to the initial speech recognition results 120a. On the other hand, the second decoder 240 improves upon the partial speech recognition results by decoding in parallel but in a time-staggered fashion so that it receives additional right-context before generating the final speech recognition results 120b. Notably, the use of two decoders 230, 240 is for operating in both the streaming and non-streaming fashion. Thus, when only operating in either the streaming or non-streaming mode, only a single one of the decoders 230, 240 may be employed. The first decoder 230 and the second decoder 240 each include a corresponding prediction network 300 followed by a corresponding joint network 250. More specifically, the first decoder 230 includes a first prediction network 300, 300a and a first joint network 250, 250a, and the second decoder 240 includes a second prediction network 300, 300b and a second joint network 250, 250b. The prediction networks 300a, 300b have a same structure that includes one of a long short-term memory (LSTM)-based prediction network or a V2 embedding look-up table. Similarly, the joint networks 250a, 250b of the first and second decoders 230, 240 have a same structure.

The first decoder 230 further includes a second joint network 410 (also referred to as an EOS network 410) configured to generate an indication of whether a particular frame corresponds to an end-of-speech segment. When the EOS network 410 identifies a frame 110 as corresponding to an end of speech segment, the first decoder 230 emits, as output, an EOS timestamp 412 to finalize the transcription 120b of the utterance 106. The EOS network 410 has a same structure as the joint networks 250a, 250b and includes one of a long short-term memory (LSTM)-based prediction network or a V2 embedding look-up table. While the component structure is similar for the first decoder 230 and the second decoder 240, the respective components of each of the first and second decoders 230, 240 may be unique and trained independently from the components of the other one of the first and second decoders 230, 240.

The cascading encoder 204 refers to a model structure where the encoding pathway includes two encoders 210, 220 that cascade such that the output of a first encoder 210 feeds the input of a second encoder 220 prior to decoding. Here, the first encoder 210 and the second encoder 220 may be cascaded irrespective of the underlying architecture of each encoder. The encoders 210, 220 may each include a stack of multi-head self-attention layers. In some examples, the first encoder 210 includes a causal encoder having one of a plurality of unidirectional (LSTM) layers, a plurality of conformer layers, or a plurality of transformer layers. For example, the first encoder 210 may include seven (7) conformer layers each having a multi-headed (e.g., eight (8) heads) self-attention mechanism and a convolutional kernel size of fifteen (15). The first three (3) layers may have no self-attention, while the remaining four (4) layers have 92-frame left context and no right context. Moreover, the first encoder 210 may perform a concatenation operation after a third conformer layer to achieve a time reduction rate of two whereby the resulting 1024-dimensional vectors are transformed by a fourth conformer layer and then projected back to a 512-dimensional vector using another linear transformation. Thereafter, additional conformer layers are followed by a final normalization layer. Thus, the first encoder 210 may include 47 million parameters. Each layer of the first encoder 210 receives zero right-context (e.g., receives zero future acoustic frames).

The second encoder 220 includes a non-causal encoder having one of one or more bi-directional LSTM layers, a plurality of conformer layers, or a plurality of transformer layers. For instance, the second encoder 220 may include six (6) conformer layers of 640-dimensions and a final linear normalization layer thereby resulting in 60 million parameters. The second encoder 220 may receive additional right-context, for example a number (e.g., three (3) or 30) of right context frames across all layers to provide 900 milliseconds (ms) of additional right context. In some implementations, the first encoder 210 includes a greater number of parameters than the second encoder 220.

With continued reference to FIG. 4, the first encoder 210 receives a sequence of d-dimensional feature vectors (e.g., sequence of acoustic frames 110) $x=(x_1, x_2, \ldots, x_T)$, where $x_t \in \mathbb{R}^d$ and generates, at each output step of a plurality of output steps, a first higher order feature representation 212 for a corresponding acoustic frame 110 in the sequence of acoustic frames 110. Similarly, the second encoder 220 is connected in cascade to the first encoder 210 and receives, as input, the first higher order feature representation 212 and the EOS timestamp 412 emitted by the first decoder 230 and generates, at each output step, a second higher order feature representation 222 for the corresponding first higher order feature representation 212. In some instances, the second encoder 220 generates the second higher order feature representation 222 without receiving any of the acoustic frames 110 as input. In these instances, the second encoder 220 generates the second higher order feature representations 222 using only the first higher order feature representation 212 as input. That is, the first higher order feature representations 212 received from the first encoder 210 serve as the additional right-context. The first encoder 210 outputs the first higher order feature representations 212 to the second encoder 220 and the first decoder 230 while the second encoder 220 outputs the second higher order feature representations 212 to the second decoder 240. Thus, the cascading encoder 204 output may be represented by:

$$f(X)=[f_0, \ldots f_{T-1}] \qquad (2)$$

With continued reference to FIG. 4, the first decoder 230 includes the first joint network 250a, the first prediction network 300a, and the EOS network 410. The first joint network 250a is configured to receive, as input, a first dense representation 352a generated by the first prediction network 300a and the first higher order feature representation 212 generated by the first encoder 210 and generate, at each output step, an initial speech recognition hypothesis 120a for a corresponding acoustic frame 110. Thus, the first joint network 250a generates the initial speech recognition hypothesis 120a based on the first higher order feature representation 212 and the first dense representation 352a. Each wordpiece from the initial speech recognition hypothesis 120a may include a word, wordpiece, phoneme, and/or grapheme. The first decoder 230 operates in the streaming fashion such that the first decoder 230 generates the initial speech recognition results 120a that may correspond to partial speech recognition results.

The first prediction network 300a receives, as input, a first sequence of non-blank symbols output by the first decoder 230 and generates, at each output step, the first dense representation 352a. In particular, the first prediction network 300a may receive the sequence of non-blank symbols from a final softmax layer (e.g., Softmax Layer 260) of the first decoder 230. Here, the sequence of non-blank symbols corresponds to the speech recognition hypothesis 120a.

In parallel with the first joint network 250a, the EOS network 410 is configured to receive, as input, the first dense representation 352a generated by the first prediction network 300a and the first higher order feature representation 212 generated by the first encoder 210 and generate, at each output step, an indication of whether the corresponding output step corresponds to an EOS segment. That is, at each output step that the first joint network 250a outputs a respective initial speech recognition hypothesis 120a, the EOS network 410 generates a corresponding indication of whether the corresponding output step corresponds to an EOS segment for the respective initial speech recognition hypothesis 120a. Simply put, the first joint network 250a generates the initial speech recognition hypotheses 120a and the EOS network 410 generates the indication of whether the output step corresponds to an EOS segment synchronously. When a corresponding output step corresponds to an EOS segment, the first decoder 230 is configured to emit, as output, an EOS timestamp 412.

Figure 5A:
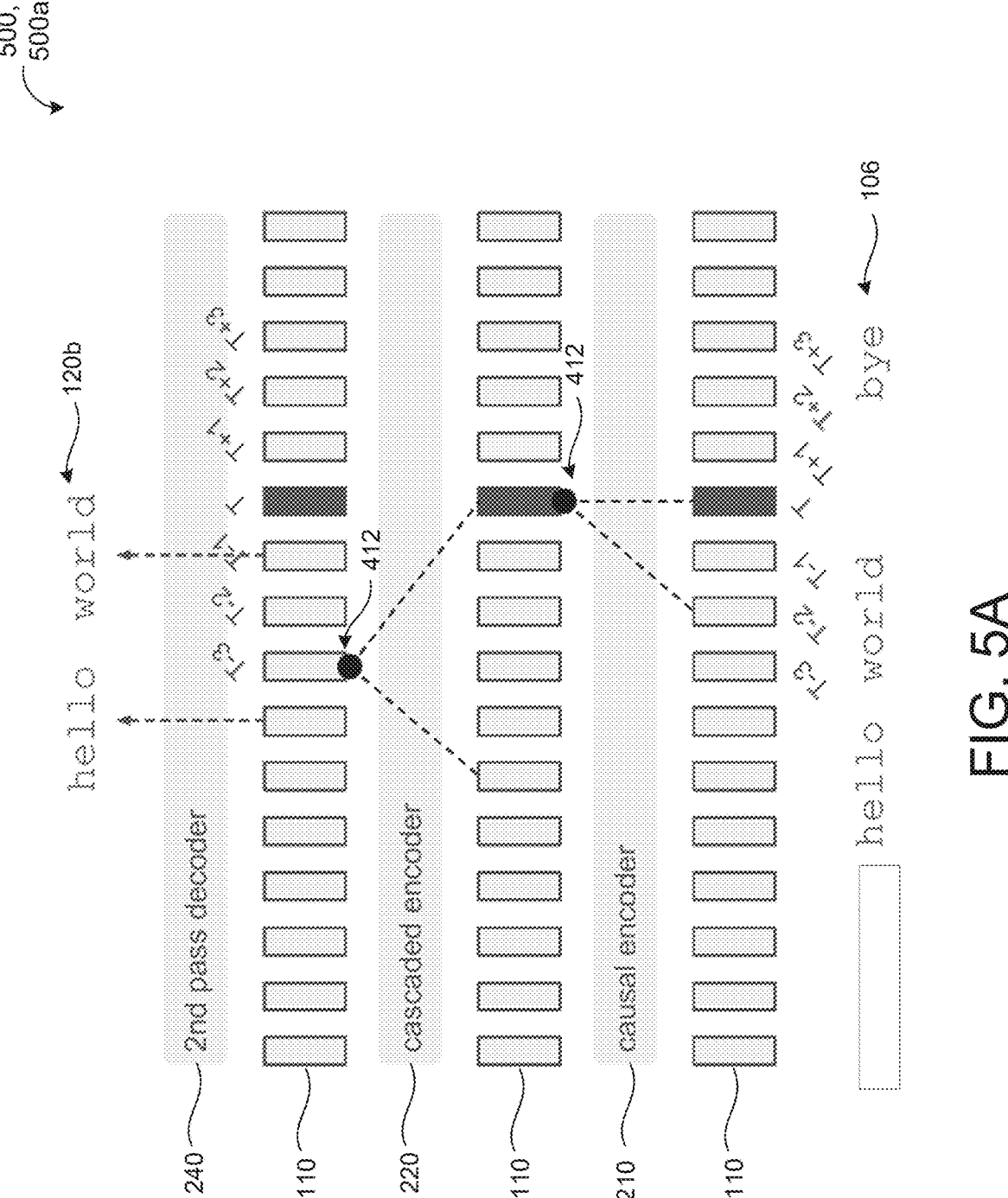
FIGS. 5A and 5B are schematic views of segmentation in the two-pass cascaded encoder ASR model of FIG. 1.
Figure 5B:
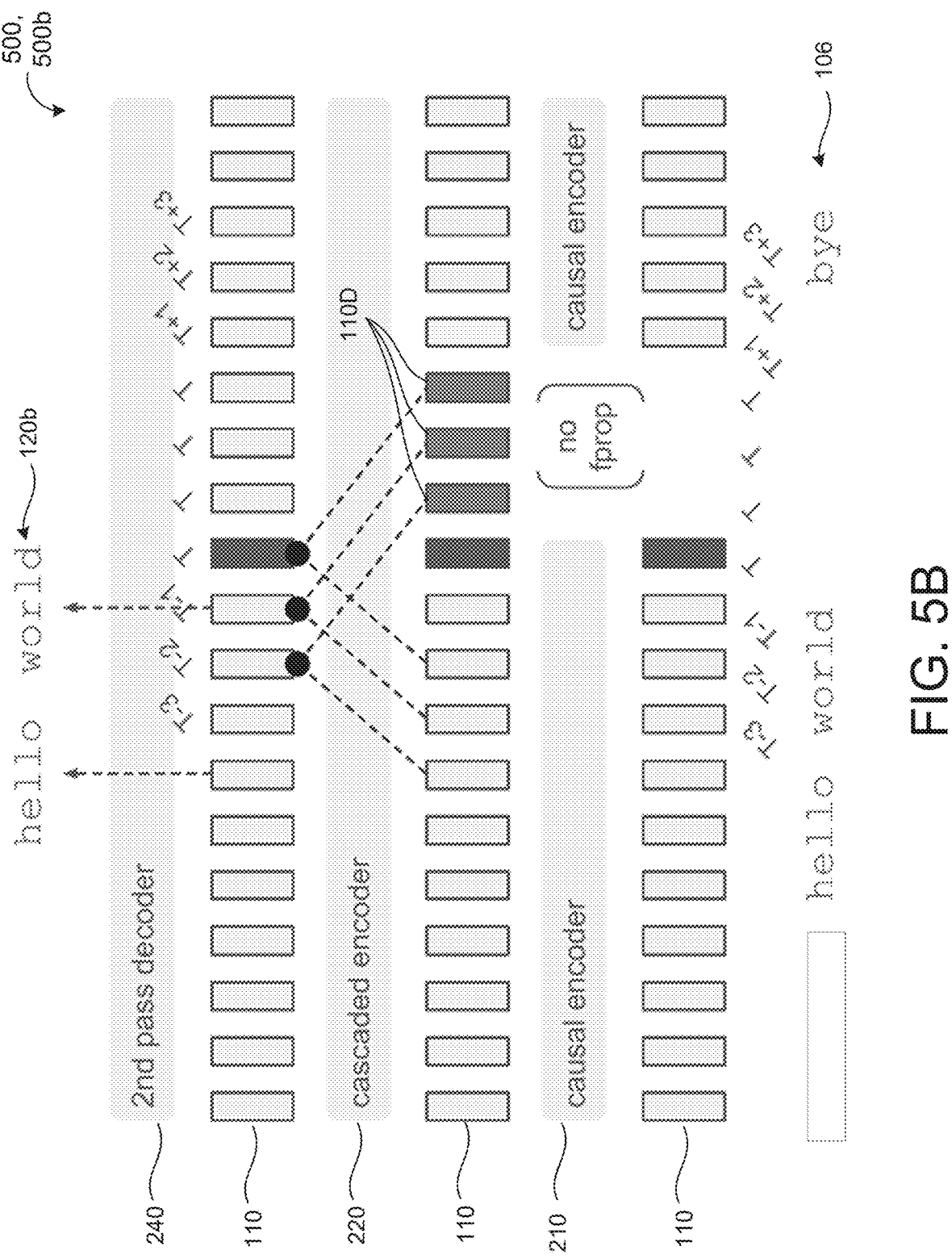

Referring to FIGS. 5A and 5B, a plurality of frames 110 characterizing an utterance 106 before and after the first decoder 230 emits an EOS timestamp 412 are shown. As shown in FIG. 5A, when the current time is T, the utterance 106 "hello world" has been spoken. At the time that the first encoder 210 is at time T, the second encoder 220 is at time T–3 frames 110 (e.g., 3 frames or 900 ms) behind the first encoder 210. As such, at time T, the second decoder 240 has yet to decode the word "world." Here, when the first decoder 230 generates an indication that the frame 110 that corresponds to the current time T corresponds to an EOS segment and emits an EOS timestamp 412, immediately finalizing the transcription 120b would stop the second decoder 240 from decoding the last three frames 110 (e.g., T–1, T–2, T–3), resulting in the deletion of "world" from the final transcription 120b. Rather than immediately finalizing the transcription 120b, when the EOS timestamp 412 is emitted by the first decoder 230, the corresponding output step (i.e., frame 110) at which the second probability distribution over possible speech recognition results generated by the second decoder 240 may be delayed by a predefined number of output steps from the corresponding output step at which the first probability distribution over possible speech recognition results is generated. Put another way, when the EOS timestamp 412 is emitted by the first decoder 230 at time T, the second decoder 240 may delay the second probability distribution over possible speech recognition results by the number of output steps that the second decoder 240 lags behind the first decoder (e.g., 900 ms). Here, the second decoder 240 may continue to generate the second probability distribution over possible speech recognition results for each of the next predefined number of output steps before finalizing a transcription 120b of the utterance.

Referring to FIG. 5B, In some implementations, when the first decoder 230 emits the EOS timestamp 412, rather than receiving additional right-context frames (e.g., 900 ms) for the output step (e.g., frame 110) corresponding to the EOS timestamp 412, the second encoder 220 is configured to receive, at the corresponding output step that corresponds to the end of speech segment, an injected number of dummy right-context frames 110D simultaneously, and process the injected number of dummy right-context frames 110D in parallel. Here, the second decoder 240 is configured to finalize a transcription 120b of the utterance 106 based on the second probability distributions over possible speech recognition results generated up until the output step (e.g., the EOS timestamp 412) when the injected number of dummy right-context frames 110D are processed in parallel by the second encoder 220 without waiting a duration equal to the predefined number of output steps before finalizing the transcription 120b of the utterance 106. In these implementations, all of the dummy right-context frames 110D may be represented by an identical vector. For example, the identical vector representing all of the dummy right-context frames 110D include a zero vector. Alternatively, all of the dummy right-context frames 110D are identical to the first higher order feature representation generated by the first encoder 210 at the corresponding output step among the plurality of output steps that corresponds to the end of speech segment.

Referring again to FIG. 4, the second decoder 240 includes the joint network 250b and the second prediction network 300b. In some configurations, the joint network 250b is configured to receive, as input, a second dense representation 352b generated by the second prediction network 300b and the second higher order feature representation 222 generated by the second encoder 220 and generate, at each output step, a final speech recognition result 120b for a corresponding acoustic frame 110. Thus, the joint network 250*b* generates the final speech recognition result 120*b* based on the second higher order feature representation 222 and the second dense representation 352*b*. The second decoder 240 operates in the streaming fashion such that the second decoder 240 generates the final speech recognition results 120*b* that may correspond to partial speech recognition results.

The second prediction network 300*b* receives, as input, a second sequence of non-blank symbols output by the second decoder 240 and generates, at each output step, the second dense representation 352*b*. In particular, the second prediction network 300*b* may receive the sequence of non-blank symbols from a final softmax layer of the first decoder 240. Here, the sequence of non-blank symbols corresponds to the speech recognition hypothesis 120 with blank tokens removed. Thus, the first and second dense representations 352*b* may be represented by:

$$g(Y)=[g_0, \ldots ,g_{U-1}] \tag{3}$$

In some implementations, the speech recognition hypothesis 120 output by the joint network 250 includes a probability distribution over possible speech recognition hypotheses. More specifically, the initial speech recognition hypothesis 120*a* may include an initial probability distribution over possible speech recognition hypotheses and the final speech recognition hypothesis 120*b* may include a final probability distribution over possible speech recognition hypotheses. Thus, the initial speech recognition hypothesis 120*a* may be used interchangeably with the initial probability distribution over possible speech recognition hypotheses and the final speech recognition hypothesis may be used interchangeably with the final probability distribution over possible speech recognition hypotheses. Here, the "possible speech recognition hypotheses" of the initial probability distribution 120*a* and the final probability distribution 120*b* correspond to a set of output labels/symbols (also referred to as "speech units") each representing a grapheme (symbol/character) or a word piece in a specified natural language. For example, when the natural language is English, the set of output labels may include twenty-seven (27) symbols, e.g., one label for each of the 26-letters in the English alphabet and one label designating a space. Accordingly, the joint network 250 may output a set of values indicative of the likelihood of occurrence of each of a predetermined set of output labels. The set of values can be a vector (e.g., a one-hot vector) and can indicate a probability distribution over the set of output labels. In some scenarios, the output labels are graphemes (e.g., individual characters, and potentially punctuation and other symbols), but the set of output labels is not so limited. For example, the set of output labels can include wordpieces and/or entire words, in addition to or instead of graphemes. The output labels could also be other types of speech units, such as phonemes or sub-phonemes. The probability distributions output by the joint network 250 can include a posterior probability value for each of the different output labels. Thus, if there are 100 different output labels representing different graphemes or other symbols, the output of the joint network 250 can include 100 different probability values, one for each output label. The probability distributions can then be used to select and assign scores to candidate orthographic elements (e.g., graphemes, wordpieces, and/or words) in a beam search process (e.g., by a final Softmax layer) for determining the speech recognition hypothesis 120. For example, the joint network 250 may select the N-best possible speech recognition hypotheses having the highest probabilities as output. Thus, the first and second joint networks 250*a*, 250*b* fuse audio features extracted by the cascading encoder 204 with language model features extracted by the first and second prediction networks 300*a*, 300*b*.

Figure 6:
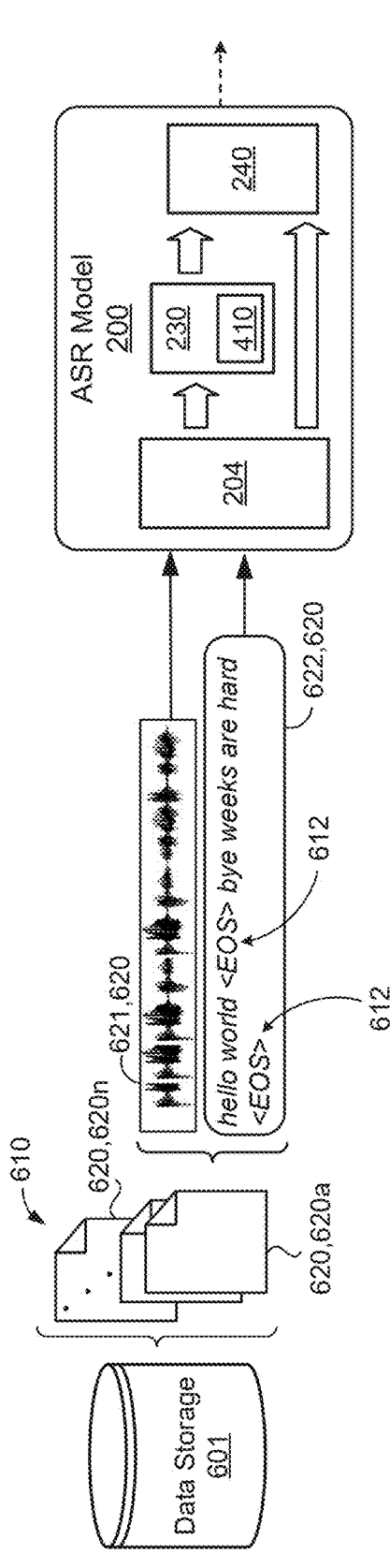
FIG. 6 is a schematic view of a training process for promoting the two-pass cascaded encoder ASR model of FIG. 1 to learn consistent segmentation.

With reference to FIG. 6, a training system 600 trains the ASR model 200 using a two-stage training process to maximize a probability of emitting an end of speech ground truth label 612. The training system 600 may execute on the remote system 60 of FIG. 1. As shown, the training system 600 obtains one or more training data sets 610 stored in a data store 601 and trains the ASR model 200 on the training data sets 610. The data store 601 may reside on the memory hardware 64 of the remote system 60. Each training data set 610 includes a plurality of training samples 620, 620*a-n*, where each training sample 620 may include audio data 621 characterizing a spoken utterance paired with a corresponding transcription 622 of the spoken utterance. Here, the corresponding transcription 622 may include an EOS ground truth label 612 inserted into the corresponding transcription 622 automatically based on a set of heuristic-based rules and exceptions applied to the training sample 620. The end of speech ground truth label 612 may be inserted into the corresponding transcription 622 automatically without any human annotation. The set of heuristic-based rules and exceptions applied to each training sample 620 in the set of training samples 610 may include inserting the end of speech ground truth label 612 at the end of the corresponding transcription 622, and inserting the end of speech ground truth label 612 into the corresponding transcription 622 at a location aligned with a non-speech segment of the audio data 621 having a duration that satisfies a threshold duration, unless the non-speech segment of the audio data 621 follows a word in the spoken utterance that is identified as a lengthened word, or the non-speech segment of the audio data 621 follows a word in the spoken utterance that is identified as a filler word. For example, the word in the spoken utterance may be identified as the lengthened word when a phoneme duration of the word satisfies a standard deviation threshold. Put another way, the plurality of corresponding transcriptions 622 may be annotated by, for example, a training data generator to include end of speech ground truth labels 612 (e.g., <EOS>) indicating an end of speech location. For example, the training data generator can use the set of heuristic-based rules and exceptions to insert <EOS> tokens at the end of short-query utterances such as voice search, as well as between two words in an utterance where a long silence is preceded by no hesitation, or an even longer silence is preceded by hesitation. After training the ASR model 200, the first decoder 230 may be configured to emit the indication that the corresponding output step corresponds to the EOS segment sooner than identifying a number of consecutive non-speech acoustic frames 110 in the sequence of acoustic frames 110 that satisfy the threshold duration.

As shown in FIG. 6, the training sample 620 includes the audio data 621 characterizing the spoken utterance "hello world by weeks are hard" paired with a corresponding transcription 622 of the spoken utterance, where end of speech ground truth labels 612 are inserted into the corresponding transcription 622. During the first stage, the training system 600 trains the cascading encoder 204, the first decoder 230, and the second decoder 240 on a speech recognition task to perform speech recognition. More particularly, the training system 600 trains the first joint network 250*a* of the first decoder 230 to learn to predict the corresponding transcription 622 of the spoken utterance characterized by the audio data 621 of each training example 620. Thereafter, during a second stage, the training system 600 initializes the EOS network 410 of the first decoder 230 using the same parameters as the trained first joint network 250a and trains the EOS network 410 to learn how to detect the presence of end of speech locations in utterances. Here, the training system 600 trains the EOS network 410 using the end of speech ground truth label 612 inserted into the corresponding transcription 622 of the spoken utterance characterized by the audio data 621 of each training sample 620.

Figure 7:
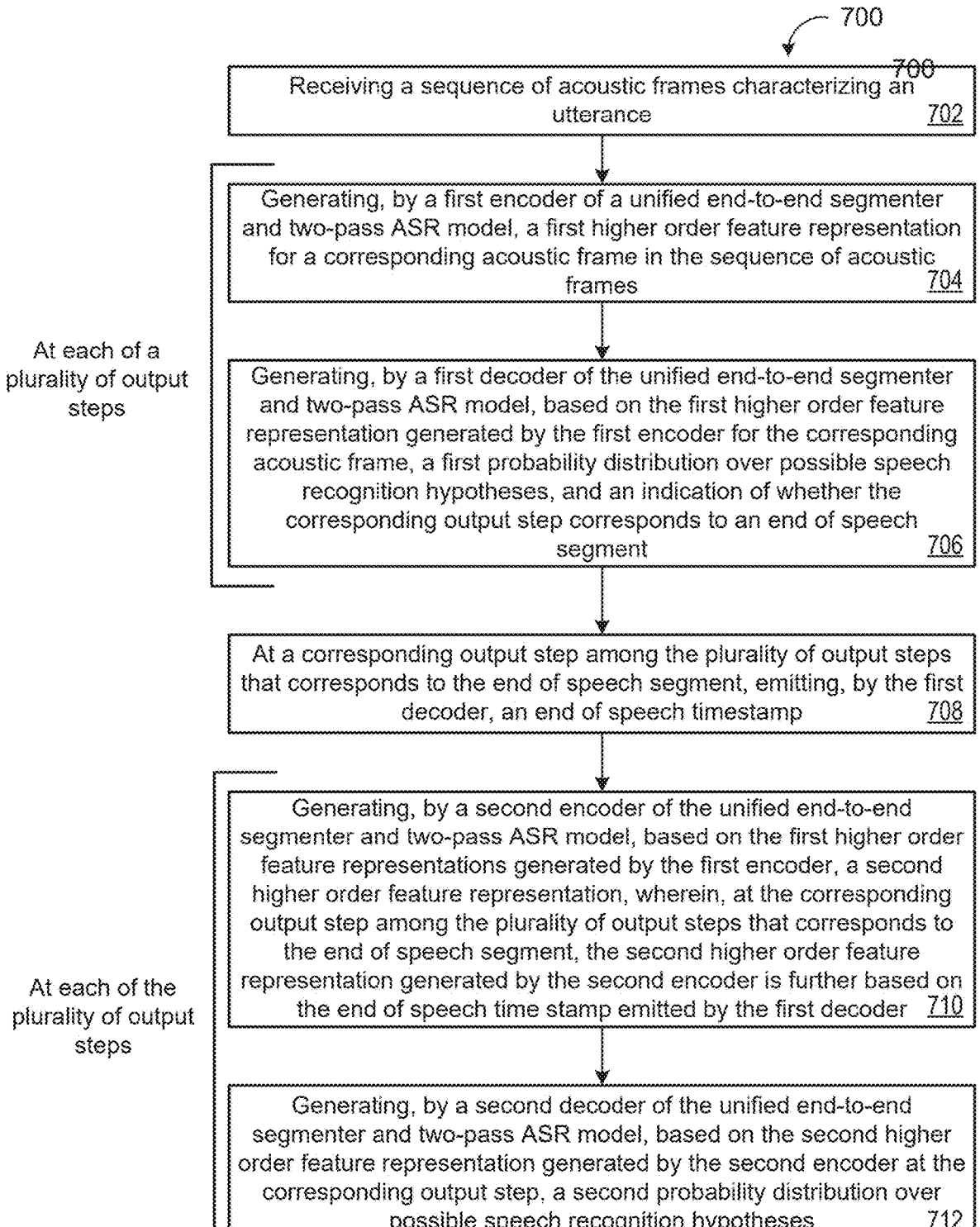
FIG. 7 is a flowchart of an example arrangement of operations for a method of performing segmentation using the two-pass cascaded encoder ASR model of FIG. 1.
Figure 8:
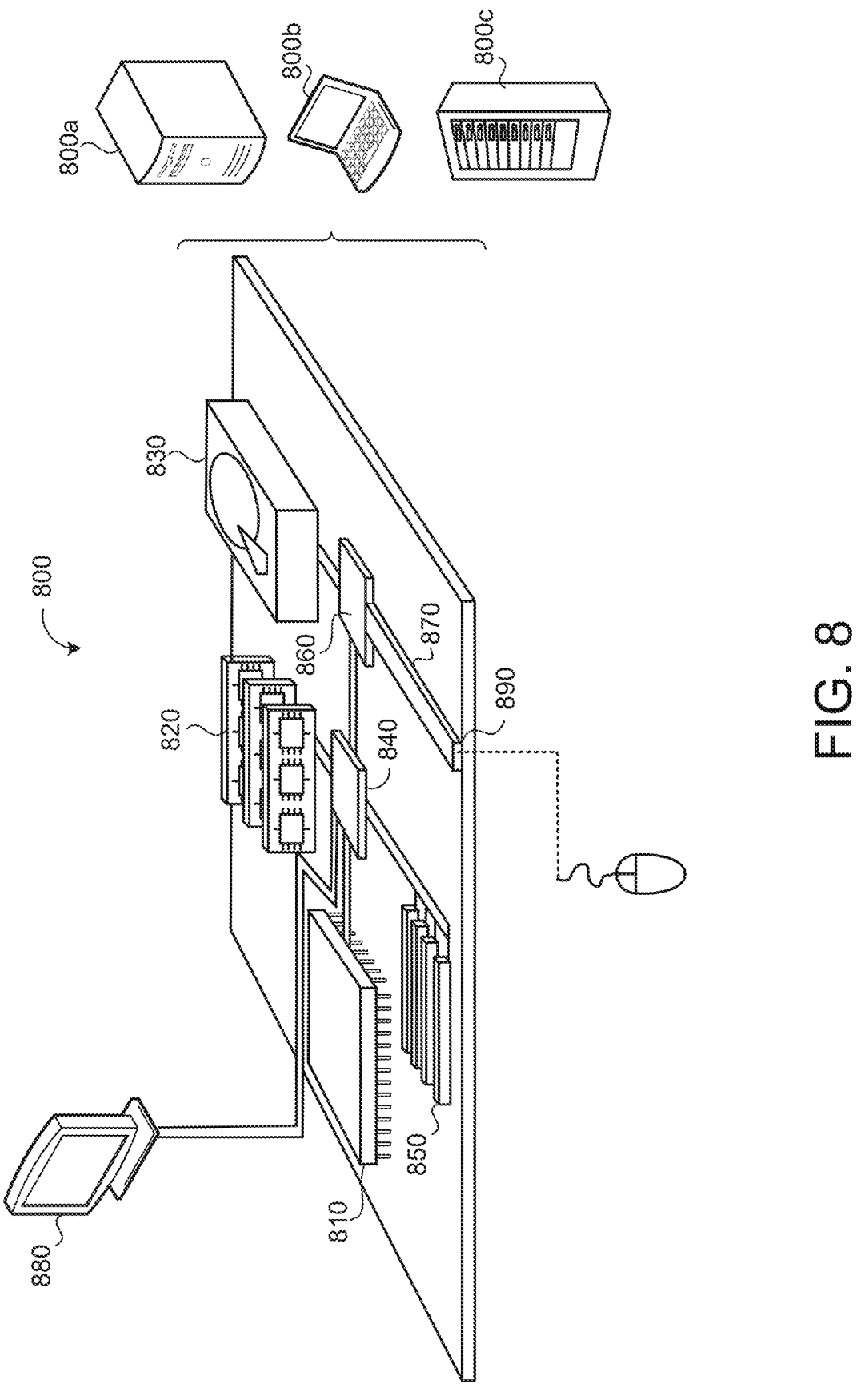
FIG. 8 is a schematic view of an example computing device that may be used to implement the systems and methods described herein.

FIG. 7 is a flowchart of an example arrangement of operations for a computer-implemented method 700 of segmentation for two-pass cascaded encoding speech recognition. The method 700 may execute on data processing hardware 810 (FIG. 8) using instructions stored on memory hardware 820 (FIG. 8). The data processing hardware and the memory hardware 820 may reside on the user device 10 and/or the remote computing device 60 of FIG. 1 each corresponding to a computing device 800 (FIG. 8).

At operation 702, the method 700 includes receiving a sequence of acoustic frames 110 characterizing an utterance 106. At each of a plurality of output steps, the method 700 also includes, at operation 704, generating, by a first encoder 210 of a unified end-to-end (E2E) segmenter and two-pass automatic speech recognition (ASR) model 200, a first higher order feature representation 212 for a corresponding acoustic frame 110 in the sequence of acoustic frames 110. At each of the plurality of output steps, the method 700 also includes, at operation 706, generating, by a first decoder 230 of the unified E2E segmenter and two-pass ASR model 200, based on the first higher order feature representation 212 generated by the first encoder 210, for the corresponding acoustic frame 110, a first probability distribution over possible speech hypotheses, and an indication of whether the corresponding output step corresponds to an end of speech segment.

At operation 708, the method 700 also includes, at a corresponding output step among the plurality of output steps that corresponds to the end of speech segment, emitting, by the first decoder 230, an end of speech timestamp 412. At each of the plurality of output steps, the method 700 also includes, at operation 710, generating, by a second encoder 240 of the unified E2E segmenter and two-pass ASR model 200, based on the first higher order feature representation 212 generated by the first encoder 230, a second higher order feature representation, 222, wherein at the corresponding output step among the plurality of output steps that corresponds to the end of speech segment, the second higher order feature representation 222 generated by the second encoder 210 is further based on the end of speech timestamp 412 emitted by the first decoder 230. At operation 712, the method 700 also includes, at each of the plurality of output steps, generating, by a second decoder 240 of the unified E2E segmenter and two-pass ASR model 200, based on the second higher order feature representation 222 generated by the second encoder 220 at the corresponding output step, a second probability distribution over possible speech recognition hypotheses.

FIG. 8 is a schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 (i.e., the data processing hardware 12 of the user device 10 or the data processing hardware 62 of the remote system 60) can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 (i.e., the memory hardware 14 of the user device 10 or the memory hardware 64 of the remote system 60) stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800*a* or multiple times in a group of such servers 800*a*, as a laptop computer 800*b*, or as part of a rack server system 800*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A system comprising:

data processing hardware; and memory hardware in communication with the data processing hardware and storing instructions that when executed on the data processing hardware causes the data processing hardware to execute a user interface and a unified end-to-end segmenter and two-pass automatic speech recognition (ASR) model, the unified end-to-end segmenter and two-pass ASR model comprising:

a first encoder configured to:

receive, as input, a sequence of acoustic frames, the sequence of acoustic frames characterizing an utterance; and generate, at each of a plurality of output steps, a first higher order feature representation for a corresponding acoustic frame in the sequence of acoustic frames;

a first decoder configured to:

receive, as input, the first higher order feature representation generated by the first encoder at each of the plurality of output steps;

generate, at each of the plurality of output steps:

a first probability distribution over possible speech recognition hypotheses; and an indication of whether the corresponding output step corresponds to an end of speech segment; and at a corresponding output step among the plurality of
   output steps that corresponds to the end of speech
   segment, emit an end of speech timestamp;
a second encoder configured to:
   receive, as input:
      the first higher order feature representation gen-
         erated by the first encoder at each of the plu-
         rality of output steps; and
      the end of speech timestamp emitted by the first
         decoder; and
   generate, at each of the plurality of output steps, a
      second higher order feature representation for a
      corresponding first higher order feature represen-
      tation; and
a second decoder configured to:
   receive, as input, the second higher order feature
      representation generated by the second encoder at
      each of the plurality of output steps;
   generate, at each of the plurality of output steps, a
      second probability distribution over possible
      speech recognition hypotheses; and
   finalize a transcription of the utterance based on the
      second probability distributions over possible
      speech recognition hypotheses generated at the
      plurality of output steps,
  wherein the user interface is configured to display the
    finalized transcription of the utterance on a screen of a
    user device.

2. The system of claim 1, wherein, when the end of speech
timestamp is emitted by the first decoder, the corresponding
output step at which the second probability distribution over
possible speech recognition results is generated by the
second decoder is delayed a predefined number of output
steps from the corresponding output step at which the first
probability distribution over possible speech recognition
results is generated.

3. The system of claim 2, wherein, when the end of speech
timestamp is emitted by the first decoder, the second decoder
is configured to generate the second probability distribution
over possible speech recognition results for each of the next
predefined number of output steps before finalizing the
transcription of the utterance.

4. The system of claim 2, wherein, when the end of speech
timestamp is emitted by the first decoder:
  the second encoder is configured to:
    receive, at the corresponding output step among the
      plurality of output steps that corresponds to the end
      of speech segment, an injected number of dummy
      right-context frames simultaneously; and
    process the injected number of dummy right-context
      frames in parallel; and
  the second decoder is configured to finalize a transcription
    of the utterance based on the second probability distri-
    butions over possible speech recognition results gen-
    erated up until the output step when the injected
    number of dummy right-context frames are processed
    in parallel by the second encoder without waiting a
    duration equal to the predefined number of output steps
    before finalizing the transcription of the utterance.

5. The system of claim 4, wherein all of the dummy
right-context frames are represented by an identical vector.

6. The system of claim 5, wherein the identical vector
representing all of the dummy right-context frames com-
prises a zero vector.

7. The system of claim 4, wherein all of the dummy
right-context frames are identical to the first higher order
feature representation generated by the first encoder at the corresponding output step among the plurality of output
steps that corresponds to the end of speech segment.

8. The system of claim 1, wherein the first decoder is
further configured to generate partial speech recognition
results based on the first probability distribution over pos-
sible speech recognition hypotheses.

9. The system of claim 1, wherein the first encoder
comprises a causal encoder comprising one of:
  a plurality of unidirectional long short-term memory
    (LSTM) layers;
  a plurality of conformer layers;
  a plurality of transformer layers; or
  a plurality of multi-head attention layers other than con-
    former or transformer layers.

10. The system of claim 1, wherein the second encoder
comprises a non-causal encoder comprising one of:
  a plurality of unidirectional long short-term memory
    (LSTM) layers;
  a plurality of conformer layers;
  a plurality of transformer layers; or
  a plurality of multi-head attention layers other than con-
    former or transformer layers.

11. The system of claim 1, wherein the first decoder
comprises:
  a prediction network configured to:
    receive, as input, a sequence of non-blank symbols
      output by a final softmax layer; and
    generate, at each of the plurality of output steps, a dense
      representation;
  a first joint network configured to:
    receive, as input, the dense representation generated by
      the prediction network at each of the plurality of
      output steps and the first higher order feature repre-
      sentation generated by the first encoder at each of the
      plurality of output steps; and
    generate, at each of the plurality of output steps, the
      first probability distribution over possible speech
      recognition hypotheses; and
  a second joint network configured to:
    receive, as input, the dense representation generated by
      the prediction network at each of the plurality of
      output steps and the higher order feature represen-
      tation generated by the first encoder at each of the
      plurality of output steps; and
    generate, at each of the plurality of output steps, the
      indication of whether the corresponding time step
      corresponds to the end of speech segment.

12. The system of claim 11, wherein, at each of the
plurality of output steps:
  the sequence of previous non-blank symbols received as
    input at the prediction network comprises a sequence of
    N previous non-blank symbols output by the final
    softmax layer; and
  the prediction network is configured to generate the dense
    representation by:
    for each non-blank symbol of the sequence of N
      previous non-blank symbols, generating a respective
      embedding; and
    generating an average embedding by averaging the
      respective embeddings, the average embedding com-
      prising the dense representation.

13. The system of claim 11, wherein the prediction
network comprises:
  a long short-term memory (LSTM)-based prediction net-
    work; or
  a V2 embedding look-up table.

14. The system of claim 1, wherein the second decoder comprises:
  a prediction network configured to:
    receive, as input, a sequence of non-blank symbols output by a final softmax layer; and
    generate, at each of the plurality of output steps, a dense representation; and
  a joint network configured to:
    receive, as input, the dense representation generated by the prediction network at each of the plurality of output steps and the second higher order feature representation generated by the second encoder at each of the plurality of output steps;
    receive, as input, the end of speech timestamp emitted by the first decoder; and
    generate, at each of the plurality of output steps, the second probability distribution over possible speech recognition hypotheses.

15. The system of claim 14, wherein the prediction network comprises:
  a long short-term memory (LSTM)-based prediction network; or
  a V2 embedding look-up table.

16. The system of claim 1, wherein the first encoder comprises a greater number of parameters than the second encoder.

17. The system of claim 1, wherein the unified end-to-end segmenter and two-pass ASR model is trained on a set of training samples, each training sample in the set of training samples comprising:
  audio data characterizing a spoken utterance; and
  a corresponding transcription of the spoken utterance, the corresponding transcription having an end of speech ground truth label inserted into the corresponding transcription automatically based on a set of heuristic-based rules and exceptions applied to the training sample.

18. The system of claim 17, wherein a training process trains the unified end-to-end segmenter and two-pass ASR model on the set of training samples by:
  initially training a first joint network of the first decoder to learn how to predict the corresponding transcription of the spoken utterance characterized by the audio data of each training sample; and
  after training the first joint network, initializing a second joint network of the first decoder with the same parameters as the trained first joint network and using the end of speech ground truth label inserted into the corresponding transcription of the spoken utterance characterized by the audio data of each training sample.

19. The system of claim 17, wherein the end of speech ground truth label is inserted into the corresponding transcription automatically without any human annotation.

20. The system of claim 17, wherein the set of heuristic-based rules and exceptions applied to each training sample in the set of training samples comprise:
  inserting the end of speech ground truth label at the end of the corresponding transcription; and
  inserting the end of speech ground truth label into the corresponding transcription at a location aligned with a non-speech segment of the audio data having a duration that satisfies a threshold duration unless:
    the non-speech segment of the audio data follows a word in the spoken utterance that is identified as a lengthened word; or the non-speech segment of the audio data follows a word in the spoken utterance that is identified as a filler word.

21. The system of claim 20, wherein the word in the spoken utterance is identified as the lengthened word when a phoneme duration of the word satisfies a standard deviation threshold.

22. The system of claim 20, wherein, after training the unified end-to-end segmenter and two-pass ASR model, the first decoder is configured to emit the indication that the corresponding output step corresponds to the end of speech segment sooner than identifying a number of consecutive non-speech acoustic frames in the sequence of acoustic frames that satisfy the threshold duration.

23. The system of claim 17, wherein the unified end-to-end segmenter and two-pass ASR model is trained to maximize a probability of emitting the end of speech ground truth label.

24. A computer-implemented method executed on data processing hardware that causes the data processing hardware to perform operations comprising:
  receiving a sequence of acoustic frames characterizing an utterance;
  at each of a plurality of output steps:
    generating, by a first encoder of a unified end-to-end segmenter and two-pass ASR model, a first higher order feature representation for a corresponding acoustic frame in the sequence of acoustic frames; and
    generating, by a first decoder of the unified end-to-end segmenter and two-pass ASR model, based on the first higher order feature representation generated by the first encoder for the corresponding acoustic frame:
      a first probability distribution over possible speech recognition hypotheses; and
      an indication of whether the corresponding output step corresponds to an end of speech segment; and
  at a corresponding output step among the plurality of output steps that corresponds to the end of speech segment, emitting, by the first decoder, an end of speech timestamp; and
  at each of the plurality of output steps:
    generating, by a second encoder of the unified end-to-end segmenter and two-pass ASR model, based on the first higher order feature representations generated by the first encoder, a second higher order feature representation, wherein, at the corresponding output step among the plurality of output steps that corresponds to the end of speech segment, the second higher order feature representation generated by the second encoder is further based on the end of speech timestamp emitted by the first decoder; and
    generating, by a second decoder of the unified end-to-end segmenter and two-pass ASR model, based on the second higher order feature representation generated by the second encoder at the corresponding output step, a second probability distribution over possible speech recognition hypotheses;
  finalizing a transcription of the utterance based on the second probability distributions over possible speech recognition hypotheses generated by the second decoder at the plurality of output steps; and
  providing, for display in a user interface displayed on a screen of a user device, the finalized transcription of the utterance.

25. The computer-implemented method of claim 24, wherein, when the end of speech timestamp is emitted by the first decoder, the corresponding output step at which the second probability distribution over possible speech recognition results is generated by the second decoder is delayed a predefined number of output steps from the corresponding output step at which the first probability distribution over possible speech recognition results is generated.

26. The computer-implemented method of claim 25, wherein, when the end of speech timestamp is emitted by the first decoder, generating the second probability distribution over possible speech recognition results comprises generating, by the second decoder, the second probability distribution over possible speech recognition results for each of the next predefined number of output steps before finalizing the transcription of the utterance.

27. The computer-implemented method of claim 25, wherein the operations further comprise, when the end of speech timestamp is emitted by the first decoder:

injecting a number of dummy right-context frames simultaneously into the second encoder at the corresponding output step among the plurality of output steps that corresponds to the end of speech segment;

processing, by the second encoder, the injected number of dummy right-context frames in parallel; and finalizing, by the second decoder, a transcription of the utterance based on the second probability distributions over possible speech recognition results generated up until the output step when the injected number of dummy right-context frames are processed in parallel by the second encoder without waiting a duration equal to the predefined number of output steps before finalizing the transcription of the utterance.

28. The computer-implemented method of claim 27, wherein all of the dummy right-context frames are represented by an identical vector.

29. The computer-implemented method of claim 28, wherein the identical vector representing all of the dummy right-context frames comprises a zero vector.

30. The computer-implemented method of claim 27, wherein all of the dummy right-context frames are identical to the first higher order feature representation generated by the first encoder at the corresponding output step among the plurality of output steps that corresponds to the end of speech segment.

31. The computer-implemented method of claim 24, wherein the unified end-to-end segmenter and two-pass ASR model is trained on a set of training samples, each training sample in the set of training samples comprising:

audio data characterizing a spoken utterance; and a corresponding transcription of the spoken utterance, the corresponding transcription having an end of speech ground truth label inserted into the corresponding transcription automatically based on a set of heuristic-based rules and exceptions applied to the training sample.

32. The computer-implemented method of claim 31, wherein a training process trains the unified end-to-end segmenter and two-pass ASR model on the set of training samples by:

initially training a first joint network of the first decoder to learn how to predict the corresponding transcription of the spoken utterance characterized by the audio data of each training sample; and after training the first joint network, initializing a second joint network of the first decoder with the same parameters as the trained first joint network and using the end of speech ground truth label inserted into the corresponding transcription of the spoken utterance characterized by the audio data of each training sample.

33. The computer-implemented method of claim 31, wherein the end of speech ground truth label is inserted into the corresponding transcription automatically without any human annotation.

34. The computer-implemented method of claim 31, wherein the set of heuristic-based rules and exceptions applied to each training sample in the set of training samples comprise:

inserting the end of speech ground truth label at the end of the corresponding transcription; and inserting the end of speech ground truth label into the corresponding transcription at a location aligned with a non-speech segment of the audio data having a duration that satisfies a threshold duration unless:

the non-speech segment of the audio data follows a word in the spoken utterance that is identified as a lengthened word; or the non-speech segment of the audio data follows a word in the spoken utterance that is identified as a filler word.

35. The computer-implemented method of claim 34, wherein the word in the spoken utterance is identified as the lengthened word when a phoneme duration of the word satisfy a standard deviation threshold.

36. The computer-implemented method of claim 34, wherein, after training the unified end-to-end segmenter and two-pass ASR model, generating the indication that the corresponding output step corresponds to the end of speech segment by the first decoder comprises emitting the indication that the corresponding output step corresponds to the end of speech segment sooner than identifying a number of consecutive non-speech acoustic frames in the sequence of acoustic frames that satisfy the threshold duration.

37. The computer-implemented method of claim 31, wherein the unified end-to-end segmenter and two-pass ASR model is trained to maximize a probability of emitting the end of speech ground truth label.

* * * * *